US011530341B1

(12) United States Patent
De Houwer et al.

(10) Patent No.: US 11,530,341 B1
(45) Date of Patent: Dec. 20, 2022

(54) SPRAY ADHESIVE

(71) Applicant: Soudal NV, Turnhout (BE)

(72) Inventors: Guy De Houwer, Vosselaar (BE); Bart Forier, Lummen (BE); Jaro Happaerts, Kortenaken (BE)

(73) Assignee: Soudal NV, Turnhout (BE)

( * ) Notice: Subject to any disclaimer, the term of this patent is extended or adjusted under 35 U.S.C. 154(b) by 0 days.

(21) Appl. No.: 17/540,713

(22) Filed: Dec. 2, 2021

(51) Int. Cl.
*C09J 153/02* (2006.01)
*C09J 109/06* (2006.01)

(52) U.S. Cl.
CPC ........... *C09J 153/02* (2013.01); *C09J 109/06* (2013.01)

(58) Field of Classification Search
CPC ......... C08K 2201/011; C08L 2205/025; C08L 2205/035; C08L 2207/04; C09J 11/08; C09J 153/02
See application file for complete search history.

(56) References Cited

U.S. PATENT DOCUMENTS

| | | | |
|---|---|---|---|
| 7,705,056 | B1 | 4/2010 | Carnahan |
| 2008/0153971 | A1* | 6/2008 | Salazar ............... C08F 297/044 |
| | | | 524/505 |
| 2010/0263784 | A1* | 10/2010 | Meyer ................... C09J 123/12 |
| | | | 524/365 |
| 2014/0065432 | A1* | 3/2014 | Wuerch ................... C09J 11/06 |
| | | | 428/447 |
| 2017/0107374 | A1* | 4/2017 | Harumashi .......... C08G 65/336 |
| 2020/0040232 | A1 | 2/2020 | Hansen et al. |

FOREIGN PATENT DOCUMENTS

| | | |
|---|---|---|
| CN | 110 041 883 B | 7/2020 |
| EP | 1 053 791 A1 | 11/2000 |

OTHER PUBLICATIONS

Search Report dated Sep. 19, 2022, in corresponding Belgian Application No. BE202105935, filed Dec. 2, 2021, 10 pages.

* cited by examiner

*Primary Examiner* — Robert D Harlan
(74) *Attorney, Agent, or Firm* — Christensen O'Connor Johnson Kindness PLLC

(57) ABSTRACT

The present invention relates to a spray adhesive essentially consisting of:
(i) from 5 to 30% by weight of an adhesive mixture comprising one or more styrenic block copolymers, and optionally one or more tackifying resins, and either
(ii) from 20 to 40% by weight of a mixture comprising hydrocarbon solvents and propellants, and
(iii) from 30 to 75% by weight of a VOC-exempt diluent.
The present invention also relates to a portable aerosol can, spray cylinder, cannister, or container onto which a nozzle for spraying can be provided, containing the spray adhesive.

11 Claims, No Drawings

SPRAY ADHESIVE

TECHNICAL FIELD

The present invention relates to a spray adhesive.

BACKGROUND ART

Spray adhesives, also known as aerosol adhesives, are adhesive formulations typically provided in portable aerosol cans, spray cylinders, cannisters, and similar containers onto which a nozzle for spraying can be provided. The aerosol makes it easy to dispense the adhesive, thus allowing the end-user to cover a large surface area. Of particular importance is the ability to control the spray pattern, avoiding overspray.

The adhesive formulation is optimized to provide excellent adhesion combined with speed and efficiency. Uniformity and the resistance to block the nozzle are equally important. Moreover, the combination of adhesive formulation and propellants is optimised to be sprayed together as a fine aerosol.

Propellants and/or solvents based on chlorofluorocarbons or other ozone depleting chemicals have been used in spray adhesives. Such spray adhesives are more and more restricted, as various regulations exist for reducing emissions from consumer products. Likewise, chlorohydrocarbons, aromatic hydrocarbons and various volatile organic solvents are critically monitored and therefore preferably avoided. By way of example, a regulation for the state of California may be found at the OAL website oal.ca.gov/publications/ccr. In title 17 CCR § 94508, a definition for aerosol adhesive is provided, as well as a definition for a "Volatile Organic Compound". In 17 CCR § 94509 a table of standards on the percentage of VOC compounds by weight is provided. The California Air Resources Board has set an upper limit of 40% by weight for volatile organic compounds in web spray adhesives and an upper limit of 30% by weight in mist spray adhesives.

The challenge therefore is to provide a spray adhesive that is compliant with CARB VOC standards, but also including the requirement set by the California Office of Environmental Health Hazzard Assessment (OEHHA), known as the "Proposition 65". The Proposition 65 list contains a wide range of naturally occurring and synthetic chemicals that are known to cause cancer or birth defects or other reproductive harm. The listed chemicals should obviously be avoided. This means that products such as 4-chlorobenzotrifluoride, which may be found in existing spray adhesives such as Gorilla spray adhesive (Heavy Duty), Boss 635C (orange), 3M Hi-Strength 90 Low VOC, should be avoided.

Although the use of various volatile organic compounds should therefore be limited or even be avoided at all, there are some exceptions. Some compounds such as methyl acetate are exempt from this CARB requirement of remaining below the 40 or 30 wt % limit. Indeed, EU risk assessment reports concluded with respect to methyl acetate that there is at present no need for further information and/or testing and for risk reduction measures beyond those which are being applied already. A full list of VOC exempt solvents maintained by the US Environmental Protection Agency may be found at epa.gov/ground-level-ozone-pollution/complete-list-voc-exemption-rules.

Interestingly, a new formulation has been found that can be used in spray adhesives that has no toxic solvents, that is CARB compliant with a composition of listed volatile organic compounds of 40% or less for web spray adhesives, even 30% or less for mist spray adhesives and that is Proposition 65 compliant.

SUMMARY OF THE INVENTION

Accordingly an adhesive spray is provided, essentially consisting of:
(i) from 5 to 30% by weight of an adhesive mixture comprising one or more styrenic block copolymers, and one or more tackifying resins,
(ii) from 20 to 40% by weight of a mixture comprising hydrocarbon solvents and propellants, and
(iii) from 30 to 75% by weight of a VOC-exempt diluent.

In case of a mist spray adhesive, the adhesive spray preferably essentially consists of:
(i) from 5 to 30% by weight of an adhesive mixture comprising one or more styrenic block copolymers, and one or more tackifying resins,
(ii) from 20 to 30% by weight of a mixture comprising hydrocarbon solvents and propellants, and
(iii) from 40 to 75% by weight of a VOC-exempt diluent.

Also provided is a portable aerosol can, spray cylinder, cannister, or container onto which a nozzle for spraying can be provided containing the adhesive spray formulation.

DETAILED DESCRIPTION OF THE INVENTION

The expression "essentially consisting of", indicates that the components (i) to (iii) must be present in the defined amounts, and that other components may be present in minute amounts, e.g., up to 5% by weight on the total of components (i) to (iii). Note in this respect that the presence of toxic solvents and components on the Proposition 65 list are excluded.

Although adhesive sprays may be based on a variety of components, excellent results have been achieved with an adhesive mixture based on styrenic block copolymers in combination with tackifying resins. Typically, the adhesive mixture is dissolved in one or move solvents. For an adhesive spray, propellants are added. As indicated above, the challenge is to reduce the content of volatile organic compounds to less than 40% wt, e.g., for a web spray adhesive, preferably less than 30% wt, e.g. for a mist spray adhesive. In some commercial adhesive spray formulations this is achieved by introducing certain fluorochlorohydrocarbons, but this is not a viable solution, as such components are not compliant with Proposition 65 and similar requirements around the world.

The adhesive mixture of the present invention comprises one or more styrenic block copolymers, and optionally one or more tackifying resins, and may further comprise minute amounts of typical additives such as antioxidants and the like. The art on styrenic block copolymers and tackifying resins in adhesives is extensive and well known to the person skilled in the art. Styrenic block copolymers (SBC's) typically consist of polystyrene blocks and rubber blocks. These polymers may be linear or branched, typically consisting of 3 or more separate blocks. For instance, SBS is a styrene-butadiene-styrene block copolymer. SIS is styrene-isoprene-styrene block copolymer. Other examples of SBC's include (selectively) hydrogenated block copolymers and block copolymers with copolymer blocks.

The adhesive mixture may be formulated around a single styrenic block copolymer, but preferably comprises a mixture of styrenic block copolymers. In a preferred embodiment, a linear SBS block copolymer is used as component (a) and a linear SIS block copolymer is used as component (b). In a preferred embodiment, the styrenic block copolymers (a) and (b) may be used at various weight ratios. Preferably, components (a) and (b) are used in a weight ratio (a):(b) in the range of 2:1 to 1:1, more preferably in a weight ratio of about 3:2.

Preferably, the linear SBS block copolymer used as component (a) has a styrene content according to ASTM D-5775 in the range of 10-45%, preferably 15-35%. Suitable examples include Kraton® D-1102, Vector® 2518A, Solprene® 4318, and Calprene® 501 sold by Quimipol. The latter is preferred.

Preferably, the linear SIS block copolymer used as component (b) has a styrene content according to ASTM D-5775 in the range of 10-45%, preferably 15-35%. Suitable examples include Kraton D-1165, Vector 4213, and Vector 4211A sold by TSRC. The latter is preferred.

The adhesive mixture preferably contains one or more tackifying resins. It may be formulated around a single tackifier, but preferably comprises a mixture of tackifying resins. In a preferred embodiment an aliphatic C5 tackifying resin is used as component (c). Moreover, preferably a thermoplastic phenolic resin is used as component (d). In a preferred embodiment, the tackifying resins (c) and (d) may be used at various weight ratios. Preferably components (c) and (d) are used in a weight ratio (c):(d) in the range of 3:1 to 1:1, more preferably in a weight ratio of about 2:1.

Component (c) preferably is an aromatic-modified aliphatic C5 tackifier, more preferably with a softening point, determined by Ball & Ring, in the range of 90 to 140° C. Suitable examples include Kristalex® F100, Regalite® R1090, Sylvalite® RE 105 XL, Novares® TT120, and Piccotac® 9095 sold by Eastman. The latter is preferred.

Component (d) preferably is an oil-soluble phenolic resin, more preferably with a softening point, determined by Ball & Ring, in the range of 140 to 170° C. Suitable examples include Hirenol CKA-1636, Resin SP-154H, Resin SP-134 or SP-560 sold by Akrochem Corp. The latter is preferred.

In the adhesive mixture of the present invention, the ratio by weight between the styrenic block copolymer(s) on the one hand and the tackifying resin(s)—if present—on the other hand preferably varies from 3:1 to 1:1, more preferably from 2:1 to 3:2, more preferably is about 4:3.

The adhesive mixture preferably comprises an antioxidant or a mixture of antioxidants. The use of primary and/or secondary antioxidants is common practice.

In a preferred embodiment of the present invention, a phenolic antioxidant together with a phosphite is used as component (e). The antioxidants may be used at various weight ratios. Preferably, the phenolic antioxidant and the phosphite are used in a weight ratio in the range of 3:1 to 1:1, more preferably in a weight ratio of about 2:1. Antioxidants, and other additives such as colorants and the like are very effective at minor amounts. If present, then they may be included in amounts up to 1% by weight of the adhesive mixture.

The phenolic antioxidant preferably is pentaerythritol tetrakis[3-[3,5-di-tert-butyl-4-hydroxyphenyl]propionate, which is sold as Irganox® 1010 by BASF. The phosphite preferably is tris(2,4-di-tert.-butylphenyl)phosphite, which is sold as Irgafos® 168 by BASF. Vulkanox® BHT is an effective antioxidant, which may also be used.

As mentioned before, the adhesive spray comprises one or more suitable solvents and one or more propellants. Suitable solvents include those that can fully dissolve the SBC/SBC's or fully dissolve the resin(s). The art on suitable organic solvents for styrenic block copolymers is extensive and well-known to the person skilled in the art. The same is true for tackifier resins. The person skilled in the art therefore has a well-defined selection of solvents, typically organic solvents, that are suitable for adhesive mixtures.

The organic solvents are used to dissolve the adhesive mixture, whereas the propellants are primarily employed to create an aerosol. However, it has been found that the propellants may further facilitate keeping the adhesive mixture in solution. Preferably, the solvent or solvents used has/have a boiling point in the range of 45 to 200° C., thereby including solvents such as cyclopentane (49.2° C.) to undecane (196° C.). Whereas solvents may also be selected from chlorohydrocarbons, such is not preferred. In fact, the solvents preferably are selected from one or more hydrocarbons, more preferably nonaromatic hydrocarbons, still more preferably alkanes and/or cycloalkanes. Most preferably, the solvent is selected from hexane, heptane, octane, nonane and their isomers and mixtures thereof, with methylcyclohexane being preferred.

Propellants for spray adhesives are typically selected from hydrocarbons having a boiling point in the range of −50 to 40° C. Suitable examples include pentane, isopentane, butane, isobutane and n-propane and mixtures thereof. Dimethyl ether is a common propellant, but is not preferred. Minor amount of DME may be used, provided the remaining amounts of solvents and propellants are sufficient to keep the adhesive mixture dissolved.

The combined amount of hydrocarbons used as solvents and propellants has to remain below 40% by weight for a web spray adhesive, preferably below 30% by weight for a mist spray adhesive, to be compliant with e.g., the regulation by the Californian Air Regulation Board. This has been surprisingly achieved by the addition of a VOC-exempt diluent. The VOC exempt compounds that are non-halogenated include acetone, methyl acetate, methyl formate, and tert-butyl acetate and mixtures thereof, with methyl acetate being preferred. The selection of the VOC-exempt diluent also depends on the use of the spray adhesive. For instance, acetone may interact with the surface on which the spray adhesive is applied, thereby limiting its use.

These VOC-exempt products are not conventional solvents for styrenic block copolymers. Nonetheless, it has been interestingly found that a formulation wherein the combined amount of solvents and propellants of from 20 to less than 40% by weight for a web spray adhesive or less than 30% by weight for a mist spray adhesive, in admixture with from 40 to 75% by weight of the VOC-exempt non-halogenated diluent is capable of successfully dissolve from 5 to 30% by weight of an adhesive mixture comprising one or more styrenic block copolymers, and one or more tackifying agents. A particularly preferred VOC-exempt diluent is methyl acetate.

From US 2010/0326598 a low VOC adhesive composition is known formulated with styrenic block copolymers and tackifying resins and further comprising methyl acetate, but this formulation concerns an adhesive for attaching roofing membranes, which therefore is not comparable to spray adhesives.

Accordingly, the present formulation comprises a mixture of a diluent or diluents, an organic solvent or organic solvents and a propellant or propellants. In a preferred embodiment, a mixture of methylcyclohexane as component (f) and methylacetate as component (g) is used. The organic solvent or solvents on the one hand, and the VOC-exempt diluent or diluents on the other hand may be used at various weight ratios. Preferably, components (f) and (g) are used in a weight ratio (f):(g) in the range of 1:4 to 1:10, more preferably in a weight ratio of about 1:5.

It is important to remain within the ranges defined above, to achieve a spray adhesive that dries efficiently, provides excellent adhesion but also carries well with the propellants.

As indicated above, propellants for spray adhesives are typically selected from hydrocarbons having a boiling point in the range of −50 to 40° C. A single propellant or a mixture may be used. Preferably, as propellant a mixture is used of isopentane, isobutane and n-propane. The amount of propellant mixture (h)-(j) versus the amount of adhesive formation (a)-(g) may vary. Suitably the amount of propellants is in the range of 15 to 45 parts by weight (pbw) on 100 pbw of the adhesive formulation, more preferably about 30 pbw on 100 pbw of the adhesive formulation.

The adhesive formulation is prepared by mixing the components. This is preferably done by first mixing the components of the adhesive mixture, the solvent(s) and the diluent(s), adding this to the suitable container, and adding a suitable amount of propellant(s).

In a more preferred embodiment, the adhesive spray essentially consist of:
(a) from 6.5 to 7.0% by weight of a linear styrene-butadiene-styrene block copolymer, with a styrene content according to ASTM D-5775 in the range of 10-45%, preferably 25-35%, more preferably 31%,
(b) from 4.5 to 5.0% by weight of a linear styrene-isoprene-styrene block copolymer, with a styrene content according to ASTM D-5775 in the range of 10-45%, preferably 25-35%, more preferably 31%,
(c) from 4.5 to 5.0% by weight of an aliphatic C5 tackifier,
(d) from 2.5 to 3.0% by weight of a thermoplastic, phenolic resin,
(e) from 0.001 to 0.01% by weight of a primary antioxidant and/or a secondary antioxidant,
(f) from 5 to 15% by weight of methylcyclohexane, and
(g) from 40 to 75% by weight of methylacetate,
wherein components (a) to (g) combine to 100%, and further comprising as propellant
(h) from 8.0 to 8.5 parts by weight of isopentane on 100 pbw of the adhesive formulation
(i) from 11.5 to 12.5 parts by weight of isobutane on 100 pbw of the adhesive formulation, and
(j) from 20.0 to 22.5 parts by weight of n-propane on 100 pbw of the adhesive formulation.

Also part of the invention is a portable aerosol can, spray cylinder, cannister, or container onto which a nozzle for spraying can be provided, containing the adhesive spray of the present invention.

The invention is illustrated by the following examples.

Examples

Spray adhesives 1-5 were made according to the following formulations set out in the Table 1 below. Spray adhesive 6 is a reference example. The amounts are in kg. First the adhesive mixture of components (a)-(e) were mixed, combined with solvent(s) (f) and diluent(s) (g), and introduced into a container, to which the propellants, components (h)-(j), were added, whereby in each instance a pressure of 4.6 bar was obtained.

TABLE 1

| Comp. | | 1 | 2 | 3 | 4 | 5 | 6 (Ref) |
|---|---|---|---|---|---|---|---|
| (a) | Vector 4211A | 3.92 | 3.33 | 6 | 6 | | 3.6 |
| | Vector 4411A | | | | | 6 | |
| (b) | Calprene 501 | 5.49 | | | | | 5.1 |
| (c) | Piccotac 9095 | 3.92 | 2.67 | | | | 3.6 |
| (d) | SP-560 | 2.35 | | | | | 2.0 |
| (e) | Irganox 1010 | 0.027 | 0.011 | 0.011 | 0.011 | 0.011 | 0.008 |
| | Irgafos 168 | 0.014 | 0.005 | 0.005 | 0.005 | 0.005 | 0.004 |
| (f) | Cyclohexane | | | | | | 35.5 |
| | Methylcyclohexane | 10.60 | 3.53 | 3.53 | 3.53 | 3.53 | |
| (g) | Acetone | | | | 29.00 | | |
| | Methyl Acetate | 55.34 | 29.00 | 29.00 | | 29.00 | |
| (h) | n-Propane | 16.73 | 5.58 | 5.58 | 5.58 | 5.58 | |
| (i) | isoButane | 9.76 | 3.25 | 3.25 | 3.25 | 3.25 | |
| (j) | isoPentane | 6.83 | 2.28 | 2.28 | 2.28 | 2.28 | |
| | DME | | | | | | 50 |
| Adhesion | (N/mm$^2$) | 1.20 | 0.89 | 0.21 | 0.15 | 0.34 | 1.07 |

Results

All adhesive formulations were stable and could be easily dispensed without blockage of the nozzle and without overspray. All adhesive formulations provided tack. This was tested in triplicate, by applying the adhesive formulations on the surface of a pair of substrates (wood), after 10 minutes pressing them together and after 7 days conditioning assessing the adhesion using a Zwick/Roell tensile test bench, type 143501.

Formulation 1 has a VOC content of 38.2% and therefore meets the requirement for a web spray adhesive. Formulations 2-5 have a VOC content of 29.5% and therefore meet the stricter requirement for a mist spray adhesive.

While illustrative embodiments have been illustrated and described, it will be appreciated that various changes can be made therein without departing from the spirit and scope of the invention.

The invention claimed is:
1. An adhesive spray, comprising:
(i) from 5 to 30% by weight of an adhesive mixture comprising one or more styrenic block copolymers and one or more tackifying resins, wherein a percentage weight ratio of the styrenic block copolymer(s) relative to the tackifying resin(s) varies from 3:1 to 1:1,
(ii) from 20 to 40% by weight of a mixture comprising nonaromatic, non-halogenated hydrocarbon solvents, and propellants, wherein the solvents are not VOC exempt, and
(iii) from 30 to 75% by weight of a VOC-exempt diluent, the VOC-exempt diluent being different from the solvents.
2. The adhesive spray of claim 1, wherein the adhesive mixture comprises a mixture of a styrene-butadiene-styrene block copolymer and a styrene-isoprene-styrene block copolymer is used.

3. The adhesive spray of claim 1, wherein the one or more tackifying resins in the adhesive mixture comprises a mixture of an aliphatic C5 tackifying resin and an oil-soluble phenolic resin.

4. The adhesive spray of claim 1, wherein the solvents are selected from one or more alkanes or cycloalkanes having a boiling point in the range of 45 to 200° C.

5. The adhesive spray of claim 1, wherein the propellants are selected from one or more hydrocarbons having a boiling point in the range of −50 to 40° C.

6. The adhesive spray of claim 1, wherein the VOC-exempt diluent is selected from one or more of the group of non-halogenated diluents comprising acetone, methyl acetate, methyl formate, and tert-butyl acetate.

7. The adhesive spray of claim 1 wherein the VOC-exempt diluent is present from 40% to 75% by weight of the adhesive spray.

8. The adhesive spray of claim 1, comprising:
   (a) from 6.5 to 7.0% by weight of a linear styrene-butadiene-styrene block copolymer,
   (b) from 4.5 to 5.0% by weight of a linear styrene-isoprene-styrene block copolymer,
   (c) from 4.5 to 5.0% by weight of an aliphatic C5 tackifier,
   (d) from 2.5 to 3.0% by weight of a thermoplastic, phenolic resin,
   (e) from 0.001 to 0.01% by weight of a primary antioxidant and/or a secondary antioxidant,
   (f) from 10 to 15% by weight of methylcyclohexane as a solvent of the solvents, and
   (g) from 65 to 70% by weight of methylacetate as the VOC-exempt diluent, wherein components (a) to (g) combine to 100%, and further comprising as propellant
   (h) from 8.0 to 8.5 parts by weight (pbw) of isopentane on 100 pbw of the adhesive formulation,
   (i) from 11.5 to 12.5 parts by weight of isobutane on 100 pbw of the adhesive formulation, and
   (j) from 20.0 to 22.5 parts by weight of n-propane on 100 pbw of the adhesive formulation.

9. The adhesive spray of claim 8, wherein the linear styrene-butadiene-styrene block copolymer has a styrene content according to ASTM D-5775 in the range of 10-45%.

10. The adhesive spray of claim 8, wherein the linear styrene-isoprene-styrene block copolymer has a styrene content according to ASTM D-5775 in the range of 10-45%.

11. The adhesive spray of claim 1, wherein the adhesive spray is contained in a portable aerosol can, spray cylinder, cannister, or container onto which a nozzle for spraying can be provided.

* * * * *